Sept. 1, 1931.  W. MITCHELL ET AL  1,821,563
CARRIER
Filed April 9, 1928   2 Sheets-Sheet 1

INVENTORS
William Mitchell
BY Peter Blink.
Morsell, Keeney, Morsell
ATTORNEYS.

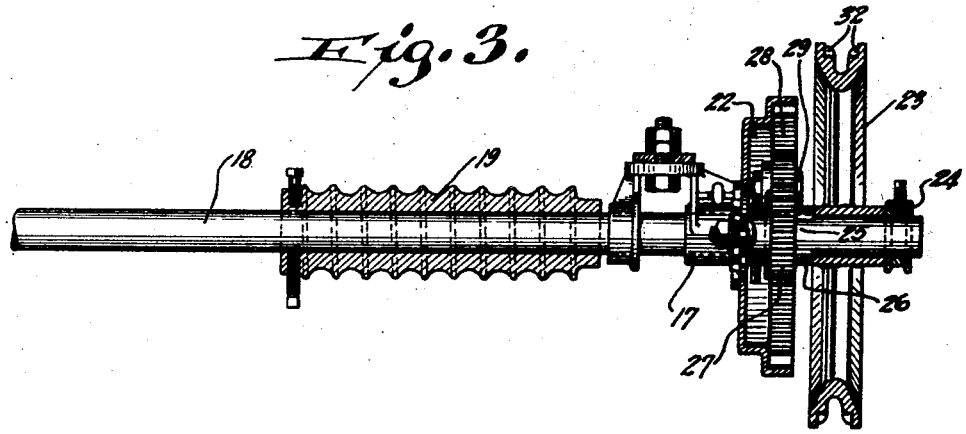
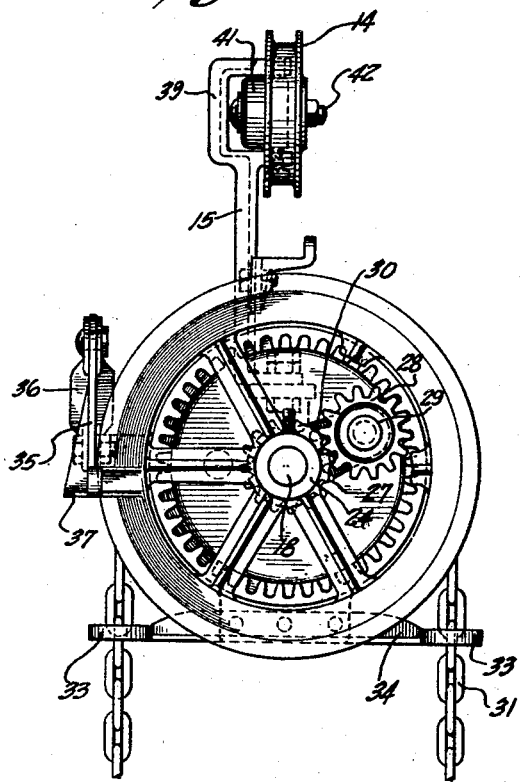
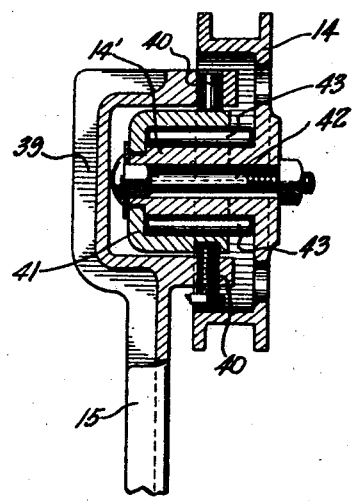

Patented Sept. 1, 1931

1,821,563

UNITED STATES PATENT OFFICE

WILLIAM MITCHELL, OF MILWAUKEE, AND PETER BLINK, OF WEST ALLIS, WISCONSIN, ASSIGNORS TO MITCHELL MANUFACTURING CO., OF MILWAUKEE, WISCONSIN, A CORPORATION OF WISCONSIN

CARRIER

Application filed April 9, 1928. Serial No. 268,739.

This invention relates to improvements in carriers, and more particularly to feed and litter carriers for use in barns and the like.

It is one of the objects of the present invention to provide an easily operated carrier of the class described having improved braking means for holding the load in any desired position.

A further object of the invention is to provide a carrier having a double trolley truck arrangement which will permit the travel of the carrier on a track regardless of the curvature of the track.

A further object of the invention is to provide a carrier having a simple and effective hoisting arrangement for the carrier box whereby the box may be easily and quickly raised.

A further object of the invention is to provide a carrier of the class described which is of very simple construction, is strong and durable, is easy and effective in its operation, and is well adapted for the purposes described.

With the above and other objects in view the invention consists of the improved carrier, and its parts and combinations as set forth on the claims, and all equivalents thereof.

In the accompanying drawings in which the same reference characters indicate the same parts in all of the views:

Fig. 3 is a sectional view taken on line 3—3 of Fig. 2;

Fig. 4 is an end view of the carrier hoisting mechanism; and

Fig. 5 is an enlarged sectional view of a trolley wheel and its mounting.

Figure 1:
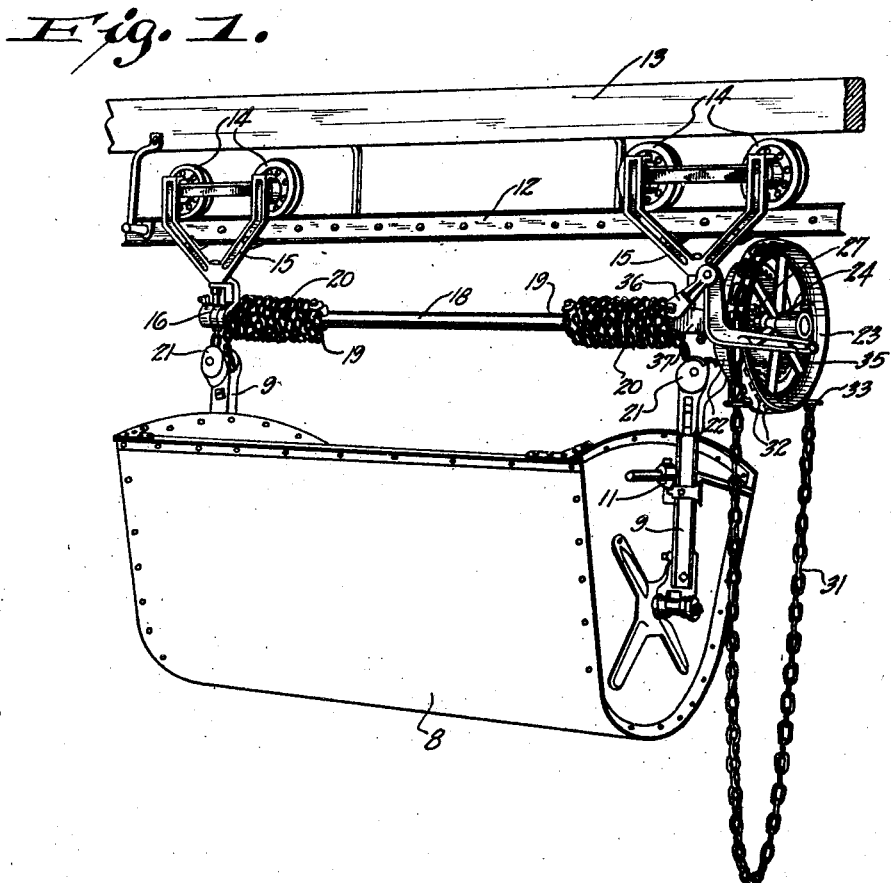
Fig. 1 is a perspective view of the improved carrier.

Referring now more particularly to the drawings it will appear that the numeral 8 indicates the box member of the improved carrier and the same has a pair of arms 9 pivotally secured to its end portions. The lower end portions of chains 20 are attached to said arms, by which means the box member is suspended and latch members 11 are provided to normally hold the box member rigidly with respect to the arms.

An elongated horizontal track 12 is suspended from a support 13 and two pairs of flanged track wheels 14 are movably carried by trolley truck frames 15. Said truck frames are formed at their lower end portions with bearings 16 and 17 in which the end portions of a shaft 18 are journaled.

Secured fast on opposite end portions of the shaft 18 are a pair of oppositely directed, screw grooved winding drums 19. The upper end portions of the chains 20 are secured to each of said drums 19 and the lower end portions of said chains extend about sheaves 21 at the upper end portions of the arms 9. By this means the box member 8 is suspended below the shaft 17 and when said chains 20 are wound or unwound with respect to the drums 19, said box member will be raised or lowered, as the case may be.

Figure 2:
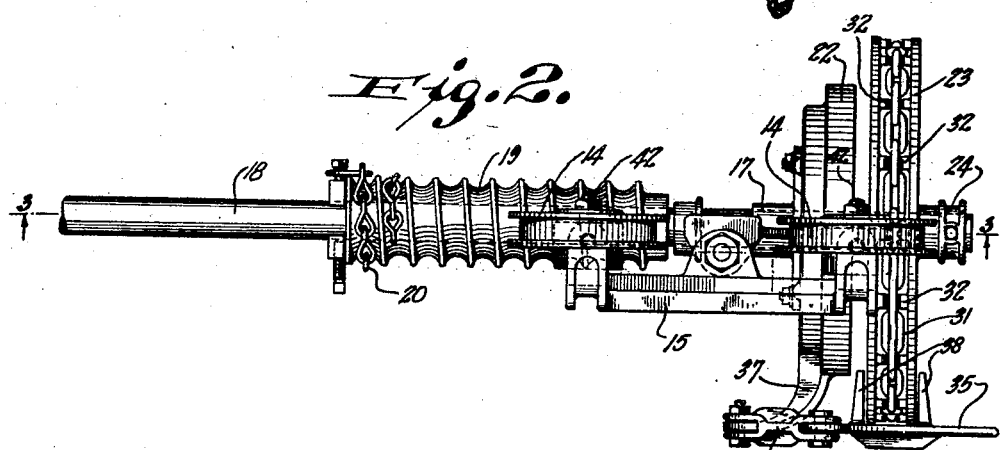
Fig. 2 is a fragmentary plan view of the same on a larger scale, the track and box being omitted.

An internal ring gear 22 is secured to the bearing 17, as shown in Fig. 2, and mounted loosely on the end portion of the shaft 18 and retained thereon by a collar 24, is a grooved wheel 23. The hub portion of said wheel is formed with an inwardly extending clutch portion 25 engaging a complementary clutch portion 26 formed on a small gear 27. Said gear 27 meshes with a gear 28 of the same size which meshes with the teeth of the ring gear 22, the ratio between said ring gear and the small gear 28 being about four to one. The gear 28 is connected by means of a wrist pin 29 with a crank 30 which is secured fast to the shaft 18 to turn the same. By this arrangement turning movement from the wheel 23 is imparted to the shaft at a reduced speed and increased power.

The wheel 23 is moved by means of a depending endless chain 31 which lies in the grooved rim of said wheel and is prevented from slippage by engaging lugs 32 cast therein. The chain passes through eyed portions 33 of a guide bracket 34 depending from the internal ring gear 22.

A brake for the wheel 23 is provided and it is in the form of a weighted lever 35 pivotally connected at its inner end portion to a link 36 which is pivotally connected to an arm 37 extending laterally from the ring gear 22. The medial portion of said lever 35 is formed with a U-shaped portion 38 and the distance between the arms of said portion is slightly greater than the thickness of the wheel 23. Hence, when said brake lever 35 is in any position but a horizontal position the arms of the U-portion 38 will bindingly engage the wheel 23 and prevent its movement.

As mentioned, each of the truck frames 15 carries a pair of flanged track wheels 14. Each truck frame is Y-shaped and the upper end portion of each arm is U-shaped, as at 39. Pivotally mounted on pins 40 within each U-shaped portion is a cupped swivel member 41. The wheels 14 are disked and formed with an intermediate hub portion 14' and the said hub portion of a wheel extends into its cupped member and is revolubly connected therewith by means of a bolt 42. Roller bearings 43 are positioned within the cupped member between the same and the hub portion 14'. The mounting of the wheels permits them to revolve very easily and also the cupped swivel members can turn with respect to the trucks 15 whereby the device will run easily on its track 12 and it can also follow very sharp curves in a track.

It will thus be seen that the carrier box may be raised and lowered very easily and that the gravity actuated brake prevents undesired downward movements. Also, the mounting of the wheels permits easy movement of the device and its travel on tracks having unusually sharp curves.

From the foregoing description it will appear that the improved carrier is of simple and novel construction, and is well adapted for the purposes described.

What we claim as our invention is:

1. Hoisting mechanism for a carrier including a depended shaft formed with a drum portion, a stationary ring gear, said shaft being revolubly extended therethrough, an operating wheel loosely mounted on said shaft, a small gear loosely mounted on the shaft and engaged by said wheel, a small gear in mesh with said first-mentioned small gear and also with said ring gear, and a lever mounted fast on said shaft and connected with said second small gear.

2. In combination with a windlass including an operating wheel, a brake lever pivotally mounted adjacent said wheel and having a U-shaped portion embracing an edge portion of said wheel, there being a binding engagement between a portion of said embracing portion and a face portion of the wheel when the lever is in any but a horizontal position.

3. Hoisting mechanism for a carrier including a depended shaft formed with a pair of drum portions, cables adapted to be wound about said drum portions, a stationary ring gear, said shaft being revolubly extended therethrough, an operating wheel loosely mounted on said shaft, there being spaced apart lugs formed on the rim of said wheel, a depending operating chain engaged by said rim lugs, a small gear loosely mounted on the shaft and engaged by said wheel, a small gear in mesh with said first-mentioned gear and also with said ring gear, a lever mounted fast on said shaft and connected with said second small gear, and a pivotal brake normally bindingly engaging a face portion of said wheel.

In testimony whereof, we affix our signatures.

WILLIAM MITCHELL.
PETER BLINK.